United States Patent [19]

Bourdin et al.

[11] 3,927,123

[45] *Dec. 16, 1975

[54] PROCESS FOR THE PREPARATION OF ALKYLPHENOLS

[75] Inventors: Francois Bourdin, Lyon; Francois Chizat, Bron; Michel Costantini, Lyon; Michel Jouffret, Francheville Le Bas, all of France

[73] Assignee: Rhone-Poulenc S.A., Paris, France

[ * ] Notice: The portion of the term of this patent subsequent to Dec. 16, 1992, has been disclaimed.

[22] Filed: Dec. 20, 1971

[21] Appl. No.: 210,208

[30] Foreign Application Priority Data
Dec. 22, 1970 France .............................. 70.46218

[52] U.S. Cl.......... 260/621 G; 260/494; 260/624 R; 260/626 R; 260/626 T
[51] Int. Cl.²................. C07C 27/00; C07C 37/00; C07C 67/44
[58] Field of Search ........ 260/621 R, 621 G, 624 R, 260/626 R, 626 T, 494, 524 M

[56] References Cited
UNITED STATES PATENTS
3,376,351   4/1968   Amedjian et al. .......... 260/621 G X OTHER PUBLICATIONS
Ogata et al., "J. Org. Chem.," Vol. 26, pp. 4803–4807, (1961).

Primary Examiner—Norman Morgenstern
Attorney, Agent, or Firm—Stevens, Davis, Miller & Mosher

[57] ABSTRACT

Phenols nuclear substituted by 1 to 3 straight-chain or branched-chain alkyl substituents of 1 to 10 carbons are prepared by oxidizing the aldehyde group of the corresponding alkyl substituted benzaldehyde with an organic peracid, which is derived from a carboxylic acid of pKa in water less than 4. The formate ester of the phenol, which may be in the reaction product, is hydrolysed or transesterified to form the phenol.

12 Claims, No Drawings

PROCESS FOR THE PREPARATION OF ALKYLPHENOLS

The present invention relates to a process for the preparation of alkylphenols, especially cresols, by oxidation of alkylbenzaldehydes by means of a peracid.

The cresols are particularly important industrial products used in the manufacture of resins, plasticisers, anti-oxidants and agricultural chemicals. Most of the cresols used in industry are extracted from the alkaline wash liquors of petroleum distillates or coal tars. They are generally obtained in the form of mixtures with phenol and xylenols. The extraction processes are generally complicated and only permit the individual cresols to be separated after numerous distillation stages and treatment of the extracts. In addition to these extraction processes, various methods of synthesis of the cresols have been proposed. Thus it is possible to hydrolyse diazonium salts of toluidines, to carry out an alkaline fusion of toluenesulphonic acids, to alkylate phenol and to decompose isopropyltoluene hydroperoxides with acid. None of these methods is entirely satisfactory however because of the reaction conditions (for example use of high temperatures or of corrosive media) or as a result of the use of uncommon starting materials.

A known process for obtaining phenols consists in oxidising an aromatic aldehyde with a peracid such as peracetic acid or perbenzoic acid, in accordance with the BAYER and WILLIGER reaction. It has been found that, if the aromatic nucleus of the aldehyde contains an electron donor group (such as a hydroxyl or alkoxy group) the reaction generally leads to the almost quantitative formation of the phenol corresponding to the aldehyde (possibly in the form of its formate). On the other hand, if the aromatic nucleus carries an electron acceptor group ( a nitro or methylcarbonyloxy group or a halogen atom) the reaction leads to the formation of the corresponding benzoic acid. Thus J. BOESEKEN et al. [Rec. Trav. Chim. Pays-Bas, 55, 815 (1936)] oxidised piperonal (3,4-methylenedioxybenzaldehyde) with peracetic acid in acetic acid in the presence of sulphuric acid as a catalyst to give 3,4-methylenedioxyphenol; various dialkoxybenzaldehydes such as 3,4-dimethoxybenzaldehyde have been oxidised to the corresponding phenol by means of peracetic acid in acetic acid in the presence of p-toluenesulphonic acid at between 30° and 35°C [J. BOESEKEN et al. (ibid. 58, 528 (1939)]; A. WACEK et al. [Ber. 73, 644 (1940), ibid. 74, 845 (1941)] oxidised various aldehydes by means of hydrogen peroxide acetic acid combinations or by means of previously formed peracetic acid in acetic acid, where appropriate in the presence of p-toluenesulphonic acid, at a temperature of between 30° and 70°C: under these conditions salicylaldehyde, 2-hydroxy-4-methyl-benzaldehyde and 2-methoxy-benzaldehyde are converted into the formate of the corresponding phenol. On the other hand, the o- and m-nitro-benzaldehydes are oxidised to benzoic acids. Oxidation of p-hydroxybenzaldehyde by perbenzoic acid in benzene at ordinary temperature produces hydroquinone in excellent yield (78%) [Y. OGATA et al.[J. Org. Chem. 26, 4803 (1961)]; in alcohol in an acid medium, p-hydroxybenzaldehyde, salicylaldehyde and p-methoxy-benzaldehyde give the corresponding phenols in excellent yields [Y. OGATA (ibid., 34, 3985 (1969)]. Though the rule stated above is confirmed in the majority of cases in the investigations indicated, some exceptions are found: J. D'ANS et al.[Ber. 48, 1136 (1915)] report that 4-methoxy-benzaldehyde is quantitatively oxidised to p-methoxybenzoic acid by peracetic acid in aqueous alcohol; Y. OGATA et al. [J. Org. Chem. 26, 4803 (1961)] also show that 4-methoxy-benzaldehyde is principally oxidised to the corresponding acid by perbenzoic acid in benzene; under the same conditions, p-methylbenzaldehyde yields p-toluic acid in a yield of 74% and p-cresol in a yield of only 26%, even though the methyl group, and in more general terms the alkyl groups, are considered to be electron donor groups. It has furthermore been found that the substitution of peracetic acid for perbenzoic acid also results in the formation of p-toluic acid from p-methylbenzaldehyde regardless of the solvent used (acetic acid, benzene, ether or alcohol).

From an industrial point of view it is however particularly valuable to be able to convert methylbenzaldehydes to the corresponding cresols because the starting products are easily obtained by oxidation of xylenes.

The present invention provides a process for the preparation of an alkylphenol of general formula

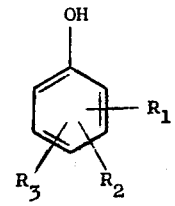

I in which each of the symbols $R_1$, $R_2$ and $R_3$ which may be the same or different, represents a hydrogen atom or a straight-chain or branched-chain alkyl radical containing 1 to 10 carbon atoms, with the proviso that not more than two of symbols $R_1$, $R_2$ and $R_3$ represent hydrogen atoms, which comprises oxidizing an alkylbenzaldehyde of general formula:

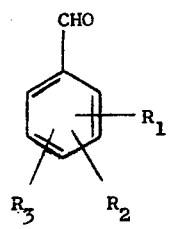

II wherein the symbols $R_1$, $R_2$ and $R_3$ are as hereinbefore defined, by means of an organic peracid, which is derived from a carboxylic acid having a pKa in water of less than 4, and, if necessary, converting any formate ester of the phenol of formula I into the phenol of formula I.

In the formulae (I) and (II) each of the symbols $R_1$, $R_2$ and $R_3$, which may be the same or different preferably represents a hydrogen atom, a methyl, ethyl, propyl, isopropyl, butyl, isobutyl, t-butyl, pentyl or nonyl radical with the proviso that not more than two of symbols $R_1$, $R_2$ and $R_3$ represent hydrogen atoms.

A list of the acids defined above is given in Handbook of "Chemistry and Physics", 45th edition (1964–1965), pages D 77 and D 78. Amongst such carboxylic acids suitable for preparing the peracid are especially formic, monochloroacetic, monobromoacetic, dichloroacetic, α-chloropropionic, trifluoroacetic, trichloroacetic, o-hydroxybenzoic, α-naphthoic, o-chlorobenzoic, o-nitrobenzoic and p-nitrobenzoic acids. Preferred peracids are preformic, trifluoroperacetic, trichloroperacetic, bromoperacetic, monochloroperacetic, α-chloroperpropionic, dichloroperacetic, α-pernaphthoic, o-nitroperbenzoic, m-nitroperbenzoic and p-nitroperbenzoic acid.

These acids may be obtained by known processes, which have been described in detail by D. SWERN [Chem. Rev. 45, page 1 (1949)], in Org. Reactions 7, 378 (1953) or in the encyclopaedia Houben-Weyl "Methoden der Organischen Chemie", Volume 8, pages 1 to 74. Depending on the particular case (in general depending on their stability) the acids can be employed either in the preformed state or by forming them "in situ" in the reaction medium. A particularly advantageous means of forming the peracid "in situ" consists of oxidising the corresponding acid with hydrogen peroxide, optionally in the presence in the reaction mixture of an acid catalyst (e.g. perchloric or sulphuric acid, or a sulphonic acid such as p-toluenesulphonic acid). The acid catalyst does not interfere with the course of the aldehyde oxidation reaction, though it does not offer any advantage in the present case.

The pre-formed peracid is generally used in the form of a solution in the corresponding acid, the concentration of which varies depending on the nature of the peracid.

The hydrogen peroxide, which may be used in the "in situ" preparation may be in the form of an aqueous solution, preferably containing 30 to 98% by weight of hydrogen peroxide.

Examples of aldehydes of formula (II) are o-tolualdehyde, p-tolualdehyde, p-isopropylbenzaldehyde, 3-isopropyl-benzaldehyde, p-tertiary butylbenzaldehyde, p-2-butylbenzaldehyde, p-pentylbenzaldehyde, 2,3-dimethylbenzaldehyde, 2,4-dimethylbenzaldehyde, 2-methyl-4-isopropylbenzaldehyde, 2-methyl-4-t-butylbenzaldehyde, 2,3,4-trimethylbenzaldehyde, 2,4,5-trimethylbenzaldehyde and 2,4-dimethyl-6-t-butylbenzaldehyde.

The temperature at which the reaction can be carried out varies within wide limits depending on the peracid and the aldehyde. Generally, temperatures of between −20° and +120°C are employed and the reaction is preferably carried out at between 0° and 80°C.

The molar ratio of peracid/aldehyde is preferably between 0.1:1 and 1.5:1 but it is generally not necessary to exceed a molar ratio of 1.1:1.

The reaction can be carried out in the absence of any solvent if the aldehyde oxidised is liquid under the reaction conditions. It is preferable to carry out the reaction in an organic solvent especially one chosen from carboxylic acids, aliphatic hydrocarbons (e.g. hexane), cycloaliphatic hydrocarbons (e.g. cyclohexane), aromatic hydrocarbons, and, halogenated aliphatic, cycloaliphatic and aromatic hydrocarbons. If an acid is used as the solvent, it may be the same or different from the acid from which the peracid is derived, but it is generally preferable to use the acid corresponding to the peracid, provided that acid is liquid under the reaction conditions. This method of working is very suitable if the peracid is prepared "in situ"; it then suffices to dissolve the aldehyde in an excess of acid and to add hydrogen peroxide to the solution. It is also possible to introduce the aldehyde and the hydrogen peroxide gradually into an excess of acid. Preferred examples of the acid solvent are formic, acetic, monochloroacetic, dichloroacetic, trichloroacetic and trifluoroacetic acids.

The hydrocarbon solvent is preferably an aromatic hydrocarbon especially benzene, toluene and ethylbenzene. Examples of the halogenated hydrocarbon compounds are chloroform, methylene chloride, 1,2-dichloroethane, chlorobenzene or benzyl chloride.

The phenol formed during the reaction is mainly present as the formate though, depending on the conditions, a part of the latter may be hydrolysed to the free phenol and formic acid by water which may be present in the reaction mixture. The phenol formed is liberated by trans-esterification by means of a volatile alcohol (e.g. methanol or ethanol), preferably acid catalysed, or by hydrolysis, especially acid or base catalysed; after the hydrolysis the acids can be isolated and can be reused in the preparation of more peracid. In this respect the use of performic acid as the oxidising agent is particularly advantageous because the reaction mixture only contains formic acid, which can be recycled for the purpose of regenerating the peracid. Such a process is very suitable for continuous operation.

The following Examples illustrate the invention:

EXAMPLE 1

186 g of anhydrous formic acid (pKa 3.75) and 40.8 g of p-tolualdehyde are introduced into a 500 cm$^3$ 3-necked flask equipped with a thermometer, a dropping funnel, a condenser, a stirring device and a nitrogen inlet; and the contents of the flask are then cooled to 0°C and 159.1 g of a 12.6% by weight solution of performic acid in formic acid are introduced gradually over 10 minutes. The stirring and temperature are maintained under these conditions until the active oxygen, as determined iodometrically on a sample of reaction mixture, has disappeared. At the end of the reaction, the mixture is filtered through a No. 3 glass frit (pore diameter 20 to 40 $\mu$). The flask is then rinsed with 50 cm$^3$ of formic acid which is subsequently used to wash the precipitate of peroxides on the filter. 415 g of filtrate and 0.870 g of precipitate are obtained, the latter being discarded.

The filtrate is thereafter concentrated by distillation under a reduced pressure of 20 mm of mercury until a temperature of 70°C is reached in the still, and 80 mg of p-toluenesulphonic acid and 100 cm$^3$ of methanol are then added to the residue. This mixture is heated under reflux for 50 minutes and the methyl formate and methanol are then distilled off. The residue is neutralised with 6 cm$^3$ of N/10 alcoholic sodium hydroxide solution and is then distilled under a pressure of 3mm of mercury so as not to exceed a temperature of 98°C in the still.

30 g of distillate and 5.52 g of residue are obtained.

The constituents of the distillate and the residue are determined by gas-liquid chromatography. In total, 30.25 g of p-cresol and 1.50 g of p-tolualdehyde are found.

2.4 g of p-toluic acid is recovered from the residue by precipitation. The results of the reaction are as follows:

| | |
|---|---|
| Degree of conversion of the aldehyde: | 96% |
| Yield of cresol | |
| relative to aldehyde converted: | 85.5% |
| relative to active oxygen: | 82.5% |
| Yield of p-toluic acid relative to the aldehyde converted: | 5.2% |

The performic acid used was obtained by reaction of 144 g of formic acid with 17.4 g (0.36 mol) of 70% by weight hydrogen peroxide for 1 hour at 20°C. 0.33 mol of performic acid is found in the solution obtained (using the method of T. LEDAAL et al. [Anal. Chim. Acta 28, 322-326 (1963)].

The gas-liquid chromatographic determination of the products obtained is carried out on a Carbowax phase on Embacel with an oven temperature of 170°C. O-cresol is used as an internal standard for determining the p-cresol. Nitrobenzene serves as an internal standard for determining p-tolualdehyde.

EXAMPLE 2

The procedure of Example 1 is followed, replacing the p-tolualdehyde by o-tolualdehyde. The temperature is maintained at 25°C. Under these conditions, the yields relative to aldehyde converted are 80.5% of o-cresol and 1% of o-toluic acid (degree of conversion of the aldehyde: 94.5%).

EXAMPLE 3 to 5

Various per-acids are used to oxidise p-tolualdehyde under the conditions, and with the results, shown in the table below:

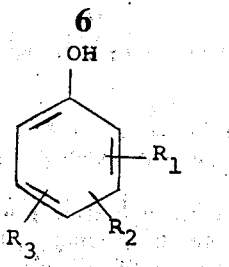

I in which $R_1$ to $R_3$ are selected from the group consisting of hydrogen and straight-chain or branched chain alkyl of 1 to 10 carbons with the proviso that not more than 2 of $R_1$, $R_2$ and $R_3$ represent hydrogen, by oxidizing an alkyl benzaldehyde of general formula

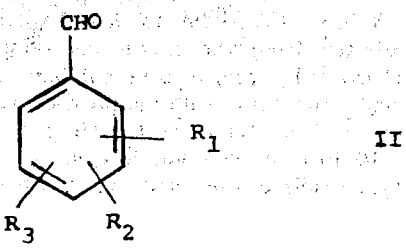

II wherein $R_1$ to $R_3$ are defined above, by means of an organic peracid, the improvement which comprises

| | Peracid | | | Solvent | | | Yields based on aldehyde converted | |
|---|---|---|---|---|---|---|---|---|
| Nature | Amount in mol | | pKa of the corresponding acid | Nature | Amount in cm³ | Temperature °C. | p-cresol | p-toluic acid |
| 3 | $CF_3$—$CO_3H$ (1)³ | $8 \times 10^{-2}$ | <0.7 | $CF_3$—COOH | 55 | 10 | 96.5% | 1% |
| 4 | $CF_3$—$CO_3H$ | $8 \times 10^{-2}$ | <0.7 | $C_6H_6$ | 55 | 10 | 97% | 3% |
| 5 | p-nitro-perbenzoic acid | $9.5 \times 10^{-3}$ | 3.41 | $C_6H_6$ | 50 | 70 | 63% | 15% |

(1) Prepared according to the method of SAGER, J. Am. Chem. Soc. 77, page 189, by reaction of a 96% hydrogen peroxide solution with trifluoroacetic anhydride at 0–5°C.

COMPARATIVE EXAMPLE

The process described in Examples 3 to 5 is repeated using a 10% by weight solution of peracetic acid in acetic acid [(obtained by adding 70% hydrogen peroxide (14.6 g, 0.3 mol) to 180 g (3 mols) of glacial acetic acid containing sulphuric acid (1 mol per 100 mols of hydrogen peroxide)]. The ratio of peracetic acid to p-tolualdehyde is 1:1 and the solution of peracid is added to a solution of the aldehyde in acetic acid containing 0.36 mol per liter. The yield of p-cresol relative to the aldehyde converted is 24% and the yield of p-toluic acid is 69%. (The pKa of acetic acid is 4.75).

EXAMPLE 6

The procedure of Example 1 is followed, replacing the p-tolualdehyde by p-isopropylbenzaldehyde. p-Isopropylphenol is obtained in a yield of 100% relative to the aldehyde converted.

We claim:

1. In a process for the preparation of an alkylphenol of general formula using an organic peracid, the parent carboxylic acid of which has a $pK_a$ in water of less than 4, whereby an oxidation product is obtained containing more alkylphenol than alkylbenzoic acid.

2. Process according to claim 1, wherein the peracid is selected from the group consisting of performic acid, trifluoroperacetic acid, trichloroperacetic acid, p-nitroperbenzoic acid, o-nitroperbenzoic acid, m-nitroperbenzoic acid, α-pernaphthoic acid, bromoperacetic acid, monochloroperacetic acid, α-chloroperpropionic acid and dichloroperacetic acid.

3. Process according to claim 1 wherein the oxidation is performed in the presence of an organic solvent.

4. Process according to claim 3 wherein the solvent is selected from the group consisting of carboxylic acids and aliphatic, cycloaliphatic and aromatic hydrocarbons and halogenated aliphatic, cycloaliphatic and aromatic hydrocarbons.

5. Process according to claim 4, wherein the solvent is selected from the group consisting of formic acid, acetic acid, monochloracetic acid, dichloroacetic acid, trichloroacetic acid, trifluoroacetic acid, benzene, toluene, ethylbenzene, chloroform, methylene chloride, 1,2-dichloroethane, chlorobenzene and benzyl chloride.

6. Process according to claim 1, wherein the reaction temperature is between −20°C and 120°C and the molar ratio of peracid/ aldehyde is between 0.1 and 1.5.

7. Process according to claim 1, wherein the peracid is formed "in situ" by reaction of hydrogen peroxide with a carboxylic acid of pKa in water less than 4.

8. Process according to claim 1 wherein each of symbols $R_1$, $R_2$ and $R_3$ which may be the same or different represents a hydrogen atom, a methyl, ethyl, propyl, isopropyl, butyl, isobutyl, t-butyl, pentyl or nonyl radical with the proviso that not more than two of symbols $R_1$, $R_2$ and $R_3$ represent hydrogen atoms.

9. Process according to claim 1 wherein $R_1$ to $R_3$ are selected from the group consisting of hydrogen, methyl, ethyl, propyl, isopropyl, butyl, isobutyl, t-butyl, pentyl and nonyl, with the proviso that not more than two of $R_1$ to $R_3$ represents hydrogen.

10. Process according to claim 1 wherein the aldehyde oxidized is selected from the group consisting of o-tolualdehyde, p-tolualdehyde, p-isopropylbenzaldehyde, 3-isopropyl-benzaldehyde, p-tertiary butylbenzaldehyde, p-2-isobutylbenzaldehyde, p-pentylbenzaldehyde, 2,3-dimethylbenzaldehyde, 2,4-dimethylbenzaldehyde, 2-methyl-4-isopropylbenzaldehyde, 2-methyl-4-t-butylbenzaldehyde, 2,3,4-trimethylbenzaldehyde, 2,4,5-trimethylbenzaldehyde and 2,4-dimethyl-6-t-butylbenzaldehyde.

11. Process according to claim 10 wherein the aldehyde oxidized is selected from the group consisting of p-tolualdehyde, o-tolualdehyde and p-isopropylbenzaldehyde, the peracid is selected from the group consisting of performic acid, pertrifluoroacetic acid and p-nitroperbenzoic acid, the solvent is selected from formic acid, trifluoroacetic acid and benzene, and the reaction temperature is 0° to 70°C.

12. Process according to claim 1 wherein the formate ester of the phenol of formula I is present in the oxidation product and is hydrolysed or transesterified to form the phenol of formula I.

* * * * *